G. A. RITZ.
CONVERTIBLE NEWSPAPER CARRIER, CART, &c.
APPLICATION FILED SEPT. 18, 1918.
1,288,997.
Patented Dec. 24, 1918.
2 SHEETS—SHEET 2.
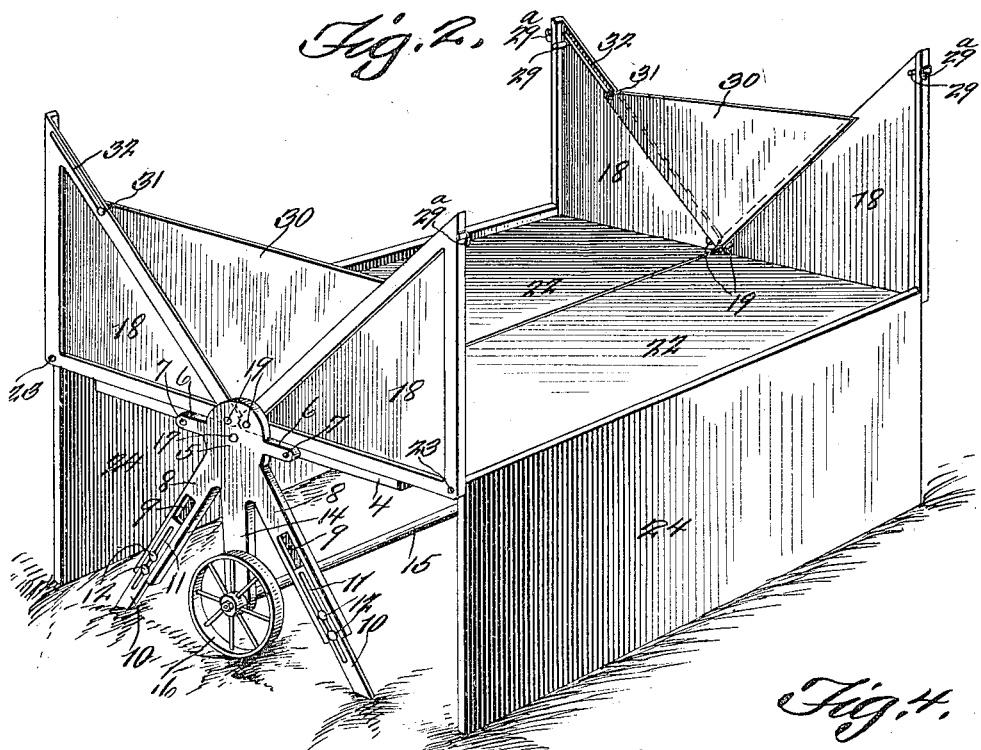
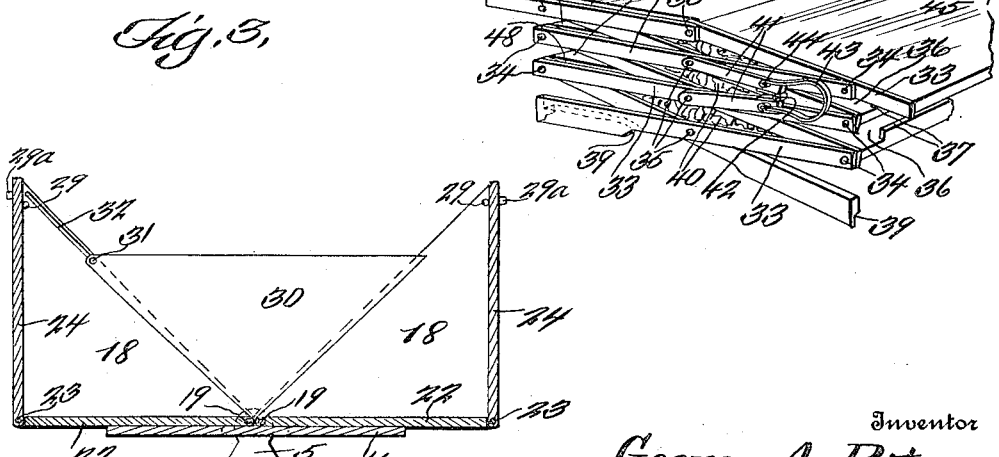
Inventor
George A. Ritz,
By Frank N. Hoyt
Attorneys
Witnesses

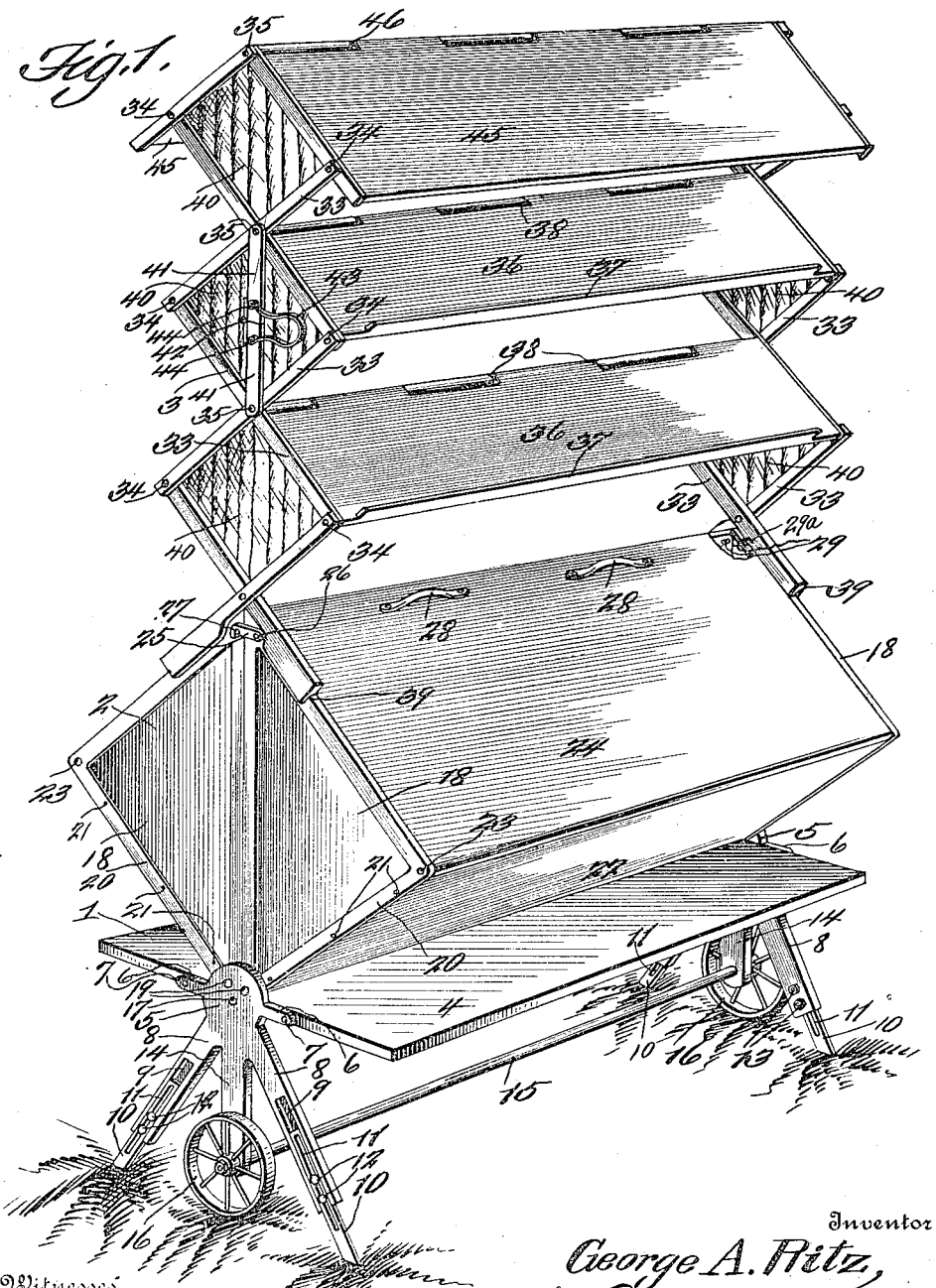

UNITED STATES PATENT OFFICE.

GEORGE A. RITZ, OF ROCHESTER, NEW YORK.

CONVERTIBLE NEWSPAPER CARRIER, CART, &c.

1,288,997.　　　　　Specification of Letters Patent.　　Patented Dec. 24, 1918.

Application filed September 18, 1918.　Serial No. 254,646.

*To all whom it may concern:*

Be it known that I, GEORGE A. RITZ, a citizen of the United States, residing at Rochester, in the county of Monroe and State of New York, have invented certain new and useful Improvements in Convertible Newspaper Carriers, Carts, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combined display rack and cart for newspapers, magazines, etc.

One of the objects of the invention is the provision of a device of this character which is convertible from a receptacle and display rack into a cart or settee.

A further object of the invention is to provide a cart or display rack which is portable from one place to another. A further object is to provide a display rack which is collapsible and provided with means comprising shelves for the support of magazines and the like on display.

A further object of the invention is the provision of means for holding the display rack extended or collapsed.

In practical fields the various features of construction may be altered, provided the alterations fall within the scope of what is claimed.

The invention comprises further various details of construction, combination and arrangement of parts which will be hereinafter fully described, shown in the accompanying drawings and then specifically defined in the appended claims.

The invention is illustrated in the accompanying drawings which, with the numerals of reference marked thereon form a part of this application and in which:

Figure 1 is a perspective view of the combined portable display rack, cart and settee constructed in accordance with my invention.

Fig. 2 is a perspective view showing the wheel supported base section of the device used as a settee.

Fig. 3 is a transverse sectional view showing the base section used as a cart body, in which newspapers and the like may be carried from one place to another.

Fig. 4 is a fragmentary detailed perspective view of the display section of the device collapsed.

Reference now being had to the details of the drawings by numerals:

1, 2 and 3 designate the three sections of the combined display rack, cart and settee. The base section comprises an elongated plate 4 which may be constructed of any suitable material, and secured to the end edges of the plate 4 are metallic plates 5, which are provided with arms or lugs 6, through which screws 7 pass into the plate 4 for securing the plates 5 in position. These plates 5 are provided with downwardly and laterally extending legs 8, the outer faces of which are provided with elongated recesses 9. Extension leg sections 10 are mounted in the recesses 9 and are supplied with elongated slots 11. Suitable bolts 12 pass through said slots and the legs 8, and are provided with nuts 13, whereby the extension leg sections 10 may be secured in different adjusted positions. The end plates 5 are provided with additional perpendicular legs 14, which are intermediate the legs 8. A suitable axle or shaft 15 is mounted in bearings of the perpendicular legs 14, and journaled on this shaft or axis are suitable supporting wheels 16.

It is obvious that by adjusting the extension leg sections 10 toward the plates 5, thereby disengaging their lower ends from the floor or other resting place, the base section may be wheeled from one place to another. Additional screws 17 pass through the plates 5 into the plate 4 so as to additionally secure the plates 5 in position, and render them more rigid.

The section 2, which may be employed as a receptacle, cart or a settee, comprises the end panel pieces 18, which may be any suitable shape, preferably triangular, and which pieces are pivotally connected between the plates 5 by elongated rods which extend the entire length of the section 2. Secured between the portions 20 of the end panels 18, as at 21, are side panels 22, which form the sides of the receptacle when the section 2 is used as such, and also form the bottom of the cart or seat of the settee, when the end panels are disposed, as shown in Figs. 2 and 3. The pivot rods 19 extend the entire length of the side panels 22 and through the same. Also pivoted between the end panels 18 upon the elongated rods 23 are the closure panels 24. When the end panels 18 are disposed, as shown in Fig. 1, they are detachably connected by the hooks 25, one being pivotally connected as at 26 by each of the end panels 18. These hooks 25 engage the pins 27, thereby holding the end panels connected as shown in Fig. 1, and when so connected the closure panels are inclined toward each other, as shown in Fig. 1. The closure panels 24 are provided with handles 28, constituting means whereby they may be opened or closed, so as to gain access to the interior of the receptacle. The closure panels, when disposed as shown in Fig. 1, contact with the abutment lugs 29 so as to be firmly supported. When the end panels are disposed as shown in Fig. 2, the closure panels 24 may be arranged in vertical positions, so as to engage the flooring or other resting place, so that the section 2 may be utilized as a settee.

Additional end panels 30 are provided, which are triangular in shape and each is connected to one of the end panels 18 by means of a pivot pin 31 which passes through a slot 32 in the end panel 18. When the end panels 18 are closed, as in Fig. 1, the additional end panels 30 are arranged in registration with the corresponding end panels 18. However, when the end panels 18 are disposed, as shown in Fig. 2, the additional panels 30 may be positioned to close the V-shaped opening between the end panels 18 by allowing the pivot pins or rivets 31 to move longitudinally in the slots 32. By arranging the closure panels 24 between the end panels 18, as shown in Fig. 3, the section 2 of the device may be used as a cart. In this instance the extension leg sections 10 may be adjusted longitudinally in the recesses 9, in fact, disengaged from the flooring, so that the device may be moved from one place to another.

The display section 3 comprises a plurality of end lazy-tong bars 33, which are pivotally united by the elongated pivot rods 24 and 25. The pivot rods 25 unite the intersecting portions of said bars, while the rods 34 unite the ends of the lazy-tong bars. Hingedly united and pivotally mounted upon the connecting rods 35 are shelves 36, which are provided with supporting ledges 37. By virtue of the supporting ledges 37, magazines and the like may be supported upon the shelves 36, which are in inclined positions when the lazy-tong bars are extended, as shown in Fig. 1. The hinged connections between the shelves 36 are indicated at 38. The lower ends of the lower-most lazy-tong bars are constructed thick enough and are provided with recessed parts 39, so as to engage the angularly arranged edges of the end panels 18 of the section 2, whereby the display section 3 may be supported in a vertical position on the section 2. The lazy-tong bars are connected by any suitable flexible material, such as fabric or the like, as shown at 40, so as to close the spaces between the bars when extended. These fabric pieces or connections are shirred or plaited vertically, as shown, thereby rendering them extensible when the lazy-tong bars are collapsed, as shown in Fig. 4.

Toggle-links 41 are pivotally connected to two of the adjacent pivot rods 35 at the ends of the display section 3. The adjacent ends of the toggle-links are hingedly united, as shown at 42. It is obvious that when the toggle-links are open, as shown in Fig. 1, their adjacent ends butt, thereby holding the lazy-tong bars extended. Bowed springs 43 are pivotally connected to the toggle-links, as shown, by means of the pins 44. It is evident that by means of these springs, the toggle-links may be held extended or open, as shown in Fig. 1, or collapsed, as shown in Fig. 4. In either case by overcoming the tension of the bowed springs, the toggle-links may be adjusted for collapsing or rendering the section 3 extensible.

Cover panels 45 are hingedly united, as at 46, on the upper-most pivot rod 35. These cover panels 45 are fixed between the upper-most lazy-tong bars. Certain of the lazy-tong bars are arranged adjacent the inner faces of certain other lazy-tong bars and since the end edges of certain of the supporting shelves 36 are spaced from certain of the lazy-tong bars, it is obvious that the lazy-tong bars may easily collapse, as shown in Fig. 4. In other words, these spaces receive certain of the lazy-tong bars to permit of the collapsing of the section 3. These spaces are shown clearly in Fig. 4 as at 47 and 48.

What I claim to be new is:

1. In combination with adjustable standards, a shaft journaled therein, a horizontally disposed plate mounted between the standards, pivotal angular end sections mounted intermediate the standards, a panel fastened to each pivotal end section, panels pivoted to the outer angled corners of the end sections and adapted when lowered to rest upon said plate, a triangular plate having sliding pivotal connection with one of the end sections and designed to engage inclined marginal edges of the end sections.

2. In combination with adjustable standards, a shaft journaled therein, a horizontally disposed plate mounted between the standards, pivotal angular end sections mounted intermediate the standards, a panel fastened to each pivotal end section, panels pivoted to the outer angled corners of the end sections and adapted when lowered to rest upon said plate, a triangular plate, a pin carried thereby, the adjacent inclined edge of the end section being slotted to receive said pin, two of the inclined edges of the triangular plate adapted to rest upon the adjacent inclined edges of the end sections when the latter are lowered.

3. In combination with standards having inclined slotted legs, extensible members mounted in slotted portions thereof, each standard having a downwardly projecting portion intermediate the extensible portions, a shaft journaled in suitable bearings in said extensions, wheels upon the shaft, each standard having laterally projecting horizontal arms, a horizontally disposed plate secured to said arms, panels pivotally mounted between the standards, closure panels pivoted to said panels which are pivoted to the standards, triangular end panels pivoted to the standards, and triangular plates having sliding pivotal connections with the end panels.

In testimony whereof I hereunto affix my signature in presence of two witnesses.

GEO. A. RITZ.

Wtnesses:
FRANKLIN H. HOUGH,
WM. F. DOYLE.

Copies of this patent may be obtained for five cents each, by addressing the "Commissioner of Patents, Washington, D. C."